Figure 1:
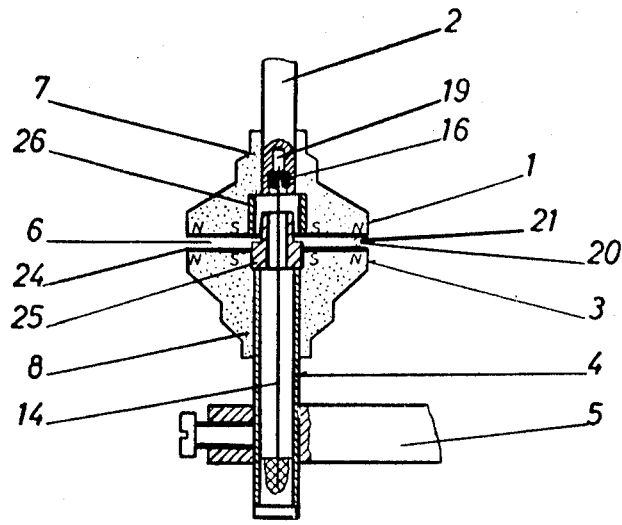

United States Patent

[11] 3,597,023

| [72] | Inventor | Max Baermann |
| | | 506 Bensberg, Bezirk, Cologne, Germany |
| [21] | Appl. No. | 856,699 |
| [22] | Filed | Sept. 10, 1969 |
| [45] | Patented | Aug. 3, 1971 |

[54] PERMANENT MAGNET BEARING
5 Claims, 2 Drawing Figs.

[52] U.S. Cl. ................................................... 308/10
[51] Int. Cl. ....................................................... F16c 39/06
[50] Field of Search ........................................ 308/10;
74/5.0, 5.7; 73/517, 497

[56] References Cited
UNITED STATES PATENTS
| 1,054,996 | 3/1913 | Stewart | 73/497 |
| 3,326,610 | 6/1967 | Baermann | 308/10 |
| 3,370,896 | 2/1968 | Atkins | 308/10 |
| 3,434,084 | 3/1969 | Milligan | 308/10 |
| 3,493,275 | 2/1970 | Stone | 308/10 |
| 2,869,934 | 1/1959 | Milligan | 308/10 |

Primary Examiner—Milton O. Hirshfield
Assistant Examiner—R. Skudy
Attorney—Meyer, Tilberry & Body ABSTRACT: A permanent magnet bearing for use with apparatus of the type having a fixed member and a member rotatable with respect thereto. The bearing comprises a pair of bodies having first and second portions formed integrally with one another. Each first portion includes a pole surface so magnetized to bias said bodies into spaced-apart relationship. Each second portion includes connecting means for securing one of the bodies to the fixed member and the other of the bodies to the rotatable member.

INVENTOR
MAX BAERMANN

BY *Meyer, Tilberry & Body*
ATTORNEYS

PERMANENT MAGNET BEARING

This invention pertains to the bearing art, and more particularly to an improved permanent magnet bearing.

The invention is particularly applicable for supporting the rotating element of an electrical meter and will be described with specific reference thereto; however, it will be appreciated that the invention has much broader applications and may be used as a bearing for a variety of precision devices.

Magnetic bearings are common in electrical measuring devices wherein the attraction forces between unlike magnetic poles or the repelling forces between like magnetic poles are used for rotatably supporting one element of the measuring device with respect to another element of the device which is generally fixed. In most instances, the particular construction of the electrical measuring device makes use of the repelling forces between like magnetic poles.

Magnetic bearings of the type described above as used in electrical measuring devices usually include a body secured to a rotatable member and a similar body secured to and supported on a fixed member. The bodies include a pole surface which is circumferentially magnetized, that is, magnetized to have one magnetic pole adjacent the internal cylindrical surface of the body and an opposite magnetic pole adjacent the external cylindrical surface of the body. By arranging like poles in corresponding positions, the repelling forces between the like poles may be conveniently used for supporting the rotatable member in spaced-apart relationship with respect to the fixed member.

In order for the above-described magnet bearing to function properly, it is essential that the two bodies be in substantially perfect alignment in the radial direction. A further requirement for proper operation of the bearing is that the airgap be of uniform thickness throughout, that is, the opposed pole surfaces of the bodies must be substantially parallel and not inclined to one another.

Heretofore, attempts to comply with the foregoing design requirements have caused numerous problems, thereby resulting in a magnetic bearing which was difficult and expensive to manufacture. Thus, for example, one prior art device employs a guide shell which is adjustably connected to the fixed member. The stationary body is guided by this shell, however there is no corresponding guide means for the rotatable body. As such, the above problems have not been fully overcome.

The present invention contemplates a new and improved apparatus and method of manufacturing same which overcomes all of the above-referred problems and others and provides a permanent magnet bearing wherein the magnets are maintained in proper axial and radial alignment.

In accordance with one aspect of the present invention there is provided a permanent magnet bearing for use with apparatus of the type having a fixed member and a member rotatable about an axis with respect thereto, comprising: a pair of bodies each having first and second portions formed integrally with one another; the first portions each including a pole surface; the pole surfaces being in opposed relationship and so magnetized as to bias the bodies axially into spaced-apart relationship; the second portions each including connecting means for securing one of the bodies to the fixed member and the other of the bodies to the rotatable member.

In accordance with another aspect of the present invention there is provided the method of manufacturing a permanent magnet bearing of the type having a pair of bodies in spaced-apart relationship, comprising the steps of: (a) forming a pair of bodies having first and second portions integral with one another from a mixture of moldable plastic binder and permanent magnet powder; (b) simultaneously forming the first portions to include a pole surface and the portions to include connecting means; and (c) applying a magnetic orienting field to the bodies.

The principal object of the present invention is to provide an improved permanent magnet bearing, the bodies of which will be maintained in substantially perfect axial and radial alignment.

Another object of the present invention is to provide an improved permanent magnet bearing having a unitary body member which includes connecting means.

A further object of the present invention is to provide an improved method for manufacturing permanent magnet bearings which is both easy and economical to perform.

Still a further object of the present invention is to provide an improved method for manufacturing permanent magnet bearings wherein connecting means may be accurately formed integrally with the bodies.

Figure 2:
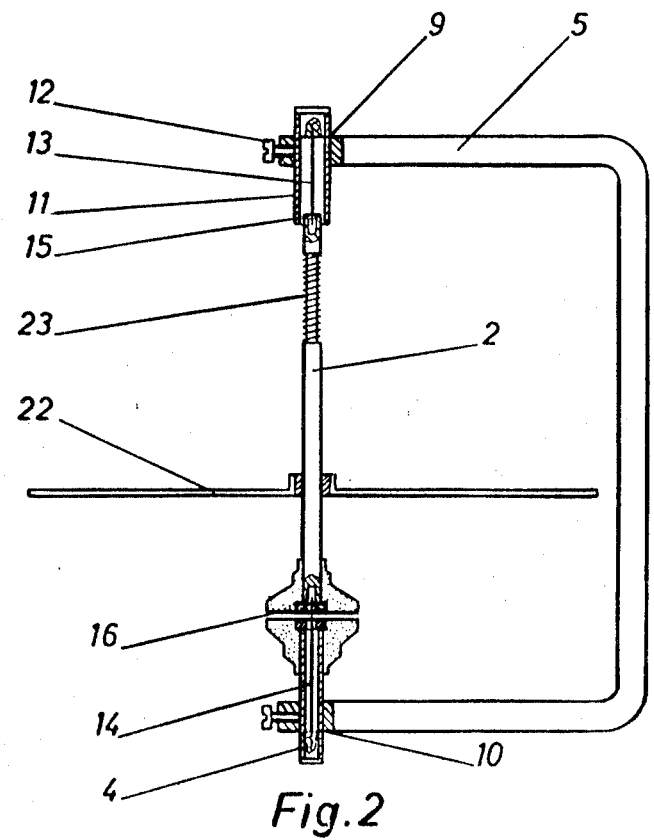

These and other objects and advantages will become apparent from the following description used to illustrate the preferred embodiments of the present invention as read in connection with the accompanying drawings in which:

FIG. 1 is an enlarged cross-sectional view of a permanent magnet bearing constructed in accordance with the preferred embodiment of the present invention; and FIG. 2 is a cross-sectional view of the permanent magnet bearing of FIG. 1 being used to support the rotor shaft of an electrical meter.

Referring now to the drawings wherein the showings are for the purpose of illustrating the preferred embodiments of the invention only and not for the purpose of limiting same, FIGS. 1 and 2 show a permanent magnet bearing constructed in accordance with the present invention and including an upper body 1 and a lower body 3.

The upper body 1 is secured to a rotatable shaft 2, and the lower body 3 is secured to a fixed support member 4. The shaft 2 and the support member 4 are maintained in a substantially vertical position by a bearing pedestal 5 which is secured to the frame of an electric meter (not illustrated).

Secured to the shaft 2 in a known way is a conventional meter braking disc 22 and a worm gear 23 which drives the counter (not illustrated) of the electric meter. The upper and lower bodies 1, 3 are in spaced-apart relationship to define an airgap 6 therebetween. In accordance with the present invention each of the bodies 1, 3 includes first and second portions formed integrally with one another, and the second portion further includes connecting means. Although the connecting means may take a variety of forms, in the preferred embodiment they are shown as bosses 7, 8; boss 7 being formed integrally with the upper body 1 and boss 8 being formed integrally with the lower body 3. The permanent magnet bearing is preferably manufactured by forming a pair of bodies 1, 3 having first and second portions integral with one another from a mixture of moldable plastic binder and permanent magnet powder. Simultaneously with the above operation, there is further formed first portions which include pole surfaces 20, 21 and second portions which include connecting means. Lastly, a magnetic orienting field is applied to the bodies 1, 3. Although it is to be appreciated that the orienting field could be applied at any time during or after the above-described forming operation, preferably the orienting field is simultaneously applied with the forming operations. The foregoing method of manufacture can be carried out by injecting molding, wherein a mold is provided having means disposed therein for centrally locating the bosses 7, 8 and then injecting into the mold, under pressure, a mixture of plastic binder material and permanent magnet powder. This process yields a permanent magnet bearing having bodies 1, 3, which when connected to their respective members, such as shaft 2 and support 4, will be in substantially perfect axial and radial alignment, inasmuch as the bosses 7, 8 are identically located in each of the magnets during the molding process.

The shaft 2 is press fitted into the boss 7 and the support member 4 is press fitted into the boss 8. This connecting operation may be facilitated by heating the bosses 7, 8 prior to inserting the shaft 2 and the support member 4. If a stronger connection is desired, the shaft 2 and support member 4 may be glued in their respective bosses 7, 8.

In order to assure perfect radial alignment of the bodies 1, 3 there is provided a lower guiding needle 14. The lower end of the guiding needle 14 is centrally secured in the fixed support member 4, for example by injection molding. The upper end of the guiding needle 14 is received in a bore of a bearing ring 16 which has been inserted in a stepped slot 19 of the shaft 2. In order to limit the radial clearance of the guiding needle 14 and avoid any possible damage to it as a result of vibrations, especially those resulting from shock to the bearing in the axial direction, there is provided a stepped guide member 25 which has been inserted in a recess in the lower body 3. The stepped guide member 25 has a small-diameter upper portion which engages an opening in an annular ring 26 that has been inserted in a recess in the upper body 1.

Reference is now made to FIG. 2, wherein there is shown a permanent magnet bearing constructed in accordance with the present invention as employed in an electric meter. For the sake of clarity the driving parts of the electric meter are not illustrated and form no part of the present invention.

The bearing pedestal 5 includes an upper bore 9 and a lower bore 10, the bores being in substantial vertical alignment. The fixed support member 4 is adjustably retained in the lower bore 10, and an upper mounting member 11 is adjustably retained in the upper bore 9. In view of this arrangement, the members 4, 11 may be adjustably displaced in the vertical direction. The bores 9, 10 are preferably threaded and the members 4, 11 are similarly threaded, whereby the vertical adjustment of the members may be accomplished by screwing them in the desired direction. The members 4, 11 are firmly secured in their desired vertical location by means of stop screws 12. However, it is to be appreciated that other means, such as locknuts, may be employed to firmly secure the members 4, 11 in the preferred location.

The upper mounting member 11 includes a centrally located upper guiding needle 13. As in he case of the lower guiding needle 14, the upper guiding needle 13 may be secured in the mounting member 11 in a variety of ways, such as by injection molding or by press fitting it into a bore in the member. The upper and lower ends of the shaft 2 are provided with stepped slots 19; the bearing ring 16 being disposed in the lower end slot, as heretofore described, and a similar bearing ring 15 is disposed in the upper end slot. The bearing rings 15, 16 are preferably made from a plastic material or graphite. The upper guiding needle engages the upper bearing ring 15 to maintain the shaft in a substantially vertical position and thereby guide the shaft in the radial direction.

Although the radial stability of the shaft 2 is provided by the upper and lower guiding needles 13, 14, axial support is effectuated by means of the pole surfaces 20, 21 which form a part of the second portion. Each pole surface 20, 21 includes a pair of concentrically arranged, circumferentially extending poles, designated by the letters "N" and "S" (as shown in FIG. 1). The poles on the lower body 3 face like poles on the upper body 1, whereby the magnets repel each other and bias the bodies into spaced-apart relationship. Although the bodies 1, 3 have been shown as being circumferentially magnetized, it is to be appreciated that they could also be magnetized in a different manner, for example, in an axial direction or partly in an axial and partly in a radial direction.

In accordance with the present invention there is provided temperature compensators 24 which are secured to the pole faces 20, 21 of the permanent magnets 1, 3. The temperature compensators 24 are arranged as a shunt to the magnetic field, whereby when the surrounding temperature increases, the magnetic resistance of the compensator rises at the same rate as the induction of the permanent magnets 1, 3 decrease, so that a constant flux is maintained in the airgap 6.

Although the invention has been described with reference to specific embodiments, variations within the scope of the following claims will be apparent to those skilled in the art.

The bodies 1, 3 are of unitary construction nd formed from permanently magnetizable material, such as barium ferrite powder. The first portions of the bodies 1, 3, which include the pole surfaces 20, 21, are of a preselected thickness; the thickness being such, that when the material is fully magnetized, a magnetic field is created adjacent the pole surfaces to maintain the bodies in spaced-apart relationship. The second portions of the bodies 1, 3 extend axially outward from the first portions thereof a distance greater than the preselected distance to form the bosses 7, 8. In this manner, the axial and radial stability of the connection between the bodies 1, 3 and the members 2, 4 is as assured.

Although the bodies 1, 3 have been shown as being formed entirely from the same material, moldable plastic binder and permanently magnetizable material, it is to be appreciated that only the first portion of each body 1, 3 need be so constructed. As such, although integral with the first portion, the second portion could be formed from nonmagnetizable material.

Having thus described my invention, I claim:

1. A permanent magnet bearing for use with apparatus of the type having a fixed member and a member rotatable about an axis with respect thereto comprising:

A pair of molded bodies each with an axis and having first and second portions molded integrally with one another and concentric to their axes, said first portions each including a large flat concentrically aligned pole surface perpendicular to the axis thereof, said surfaces arranged in opposed parallel relationship and magnetized so as to bias said bodies axially into parallel spaced-apart relationship, said second portions each extending axially away from said first portion a greater distance than said first portion thickness, and both portions of each body having an axially aligned hole formed by molding therethrough, said fixed member being affixed in axial alignment with the hole of one body and said rotatable member being affixed in axial alignment with the hole of the other body so both fixed and rotatable members are in axial alignment.

2. A bearing according to claim 1 which includes a guiding needle having one end fixedly mounted in one member with the other end extending axially towards the second member, a bearing ring fixedly mounted to the second member slidably receiving the other end of the needle to assist in maintaining axial alignment between the members.

3. A permanent magnet bearing according to claim 2 which includes an annular guide means surrounding the needle in spaced relation thereto and affixed in axial alignment to the first portion of one body with one end extending towards the other body, and an annular ring surrounding said needle in spaced relation thereto and affixed in axial alignment to the first portion of the other body to receive the extended end of said guide means in loose-fitting normally radially noncontacting relation.

4. A permanent bearing according to claim 3 where the large flat concentrically aligned pole surface has a greater radial surface area than the thickness of said first portion.

5. The permanent magnet bearing defined in claim 1 wherein said first portion further includes temperature compensators carried by said pole surfaces.